United States Patent
Pilegaard

(10) Patent No.: US 9,732,990 B2
(45) Date of Patent: Aug. 15, 2017

(54) BIASED DRIVE ASSEMBLIES FOR HELIOSTATS

(71) Applicant: eSolar Inc., Burbank, CA (US)

(72) Inventor: Ulrik Pilegaard, Woodland Hills, CA (US)

(73) Assignee: eSolar Inc., Burbank, CA (US)

( * ) Notice: Subject to any disclaimer, the term of this patent is extended or adjusted under 35 U.S.C. 154(b) by 154 days.

(21) Appl. No.: 14/494,584

(22) Filed: Sep. 23, 2014

(65) Prior Publication Data

US 2016/0084533 A1  Mar. 24, 2016

Related U.S. Application Data

(60) Provisional application No. 61/881,080, filed on Sep. 23, 2013.

(51) Int. Cl.
  *F24J 2/54*  (2006.01)
  *F24J 2/07*  (2006.01)
  *F24J 2/40*  (2006.01)

(52) U.S. Cl.
  CPC ............. *F24J 2/5427* (2013.01); *F24J 2/07* (2013.01); *F24J 2/405* (2013.01); *F24J 2002/5437* (2013.01); *F24J 2002/5462* (2013.01); *F24J 2002/5493* (2013.01)

(58) Field of Classification Search
  CPC ....................................................... F24J 2/405
  USPC ........................................................ 126/607
  See application file for complete search history.

(56) References Cited

U.S. PATENT DOCUMENTS

| | | | |
|---|---|---|---|
| 3,665,482 A | 5/1972 | Cresswell | |
| 4,821,705 A | 4/1989 | Trihey | |
| 7,823,583 B2 | 11/2010 | Allen | |
| 8,176,806 B2 * | 5/2012 | Boeing | F24J 2/542 126/576 |
| 8,407,950 B2 | 4/2013 | Hartelius | |
| 8,766,091 B2 | 7/2014 | Edwards | |
| 2013/0042856 A1 | 2/2013 | Switkes et al. | |

FOREIGN PATENT DOCUMENTS

| | | | |
|---|---|---|---|
| DE | 102006028230 A1 * | 12/2007 | ............... F24J 2/405 |
| DE | 102010014788 | 10/2011 | |
| DE | 102012021106 | 8/2013 | |
| EP | 0079184 | 5/1983 | |

\* cited by examiner

*Primary Examiner* — Terence Boes
(74) *Attorney, Agent, or Firm* — Peter Haderlein

(57) ABSTRACT

A drive assembly for a heliostat is described, wherein the drive assembly may be configured to dynamically adjust the position of an attached reflector in concentrated solar power applications. The drive assembly may be further configured to provide for biasing of the reflector to reduce backlash due to external loads. The biasing force may be provided by at least one of a spring, counterweight, or offset of the center of gravity of the reflector or other attachment, or some combination thereof.

12 Claims, 5 Drawing Sheets

BIASED DRIVE ASSEMBLIES FOR HELIOSTATS

CROSS-REFERENCES TO RELATED APPLICATIONS

The present application claims priority to and the benefit of U.S. Provisional Patent Application No. 61/881,080, filed on Sep. 23, 2013, the entire disclosure of which is incorporated herein by reference.

BACKGROUND OF THE INVENTION

This disclosure relates generally to heliostats having reflectors configured to redirect sun light to a target or receiver, and in particular to heliostat drive assemblies configured to dynamically control the position of the reflectors.

In Concentrating Solar Power (CSP) plants, arrangements of heliostats reflect sunlight toward a receiver mounted atop a tower containing a working fluid. One type of receiver transfers incident radiant energy to the working fluid to produce high-pressure, high-temperature steam through the means of a heat exchanger or a phase change of the working fluid itself. The working fluid can be water, air, or a salt material heated to a molten state. The output steam can facilitate a variety of applications, such as electrical power generation, enhanced oil recovery, and desalination. Heliostats are generally mounted on the ground in an area facing or surrounding the receiver tower. Each heliostat has a reflector: a rigid reflective surface, such as a mirror, that tracks the sun through the actuation of a heliostat drive mechanism about at least one axis. Sun-tracking involves orienting the reflector throughout the day so as to optimally redirect sunlight from the sun toward the receiver and maintain the desired temperature of the working fluid.

One approach to constructing a heliostat field is to utilize a small amount of comparatively large heliostats (e.g., greater than between 50 and 150 m²). In such a power plant, having a fewer number of heliostats may necessitate the manufacture of very precise, and thus very expensive, components for the positioning of the reflective surfaces. Another approach, however, is to use a large amount of comparatively small heliostats (e.g., between 1 and 10 m²), such as with reflective surfaces that measure between 1 and 3 m on each side. Such an approach may be more efficient at redirecting sun light because there are more individually adjustable reflective surfaces. In addition, smaller heliostats may be cheaper to produce and easier to assemble, decreasing installation time and operations costs. However, a plant comprising more heliostats will necessarily require the same amount of additional drive assemblies, increasing the number of repeated steps during installation. Accordingly, there is a need for heliostat assemblies that are both economical to manufacture and efficient to install.

One problem with controlling the positioning of heliostats is that sun-tracking must be precise, and the orientation of the reflective surface must be under a certain prescribed angular tolerance at all times. This is because accurate positioning of the reflectors is necessary to maintain efficiency of the power plant. However, wind and other environmental factors may apply loads to the reflector that move the reflector away from its preferred orientation at a given point in time of tracking the sun. Such forces may contribute to motion in the drive mechanisms and may cause deviation in the reflector from its preferred orientation at a given instant. Manufacturing tolerances between the components of the heliostat may also contribute to backlash, undesirable movement and non-linearity in the drive systems. These tolerances may undesirably result in a greater amount of variation between the calculated and the actual reflector orientation. Consequently, such variation may lead to inefficient tracking of the sun and decreased efficiency in reflecting radiant solar energy toward the receiver, as well as excessive wear and tear to mechanical parts.

SUMMARY OF THE INVENTION

Improved heliostat drive assemblies are described herein, wherein the assemblies have multiple degrees of freedom and are configured to advantageously reduce the impact of backlash in order to improve pointing accuracy. The improved drive assemblies thereby increase the efficiency in reflecting radiant solar energy toward the receiver, while reducing wear and tear to mechanical components. To provide these advantages, a controlled force may be applied to the gear train to load the gears in the opposite direction of any backlash, a process hereafter referred to as "biasing". In one preferred embodiment, biasing may be provided by positioning the center of mass location of the mirror (and attached components) respective to the center of rotation of the heliostat about its primary or secondary axis. The center of mass location may be positioned by offsetting the reflector and/or adding ancillary masses. Instead, or in addition, biasing may be provided using a spring and by zeroing the position of at least one of the degrees of freedom of the drive assembly. This combination may be tailored to ensure an amount of bias above a desired limit (e.g., as determined by a wind load histogram) at all orientations deemed relevant for sun-tracking about one or both of the degrees of freedom. When combined with the gravity load from the structure itself, a biasing force may result in a more constant total combined force on the gear train.

Each of the heliostat drive assemblies may comprise a drive chassis, at least one drive shaft; at least one gear transmission for rotating the at least one drive shaft relative to the drive chassis; and at least one spring connected to the at least one drive shaft, wherein the at least one spring biases the at least one drive shaft against at least one external force. Each of the heliostat drive assemblies may additionally comprise at least one axis of rotation for an attached reflector. For example, the drive assembly may have two axes: a primary axis and a secondary axis. At least one axis may be biased such that there is a generally predetermined minimum biasing force on the axis in a predetermined rotational direction. By having at least one of the axes biased in a predetermined rotational direction, the ability of wind loads and other external forces to cause undesirable motion, such as backlash, may be significantly reduced and even eliminated.

The biasing force should be selected such that it continues to act against undesirable motion in at least one predetermined rotational direction in the presence of maximum predicted external loads. On the other hand, it may be undesirable to have the biasing force be too great because that may necessitate larger torque output for the motors, additional gears, and other modifications that may add to complexity and costs of the heliostat assemblies.

In order to balance these two competing objectives, in one aspect of the present invention the generally predetermined biasing force may be selected based upon the statistical distribution of wind loads, whether predicted or actual, and other external events that a given reflector in an array of reflectors may experience. Such events may be predicted to apply a maximum load on at least one reflector in the array. The biasing force may then be selected such that even at the maximum predicted load, or at a load which may be above a significant portion of all expected events, a biasing force will still act against undesirable motion to maintain the pointing accuracy of the reflector. If all of the heliostats in the array have the same design, then they may all be configured with the same biasing force about at least one of the primary and secondary axes. Alternatively, the biasing forces for individual heliostats or groups of heliostats in an array may be customized for optimal performance, e.g., depending on the location of a heliostat or group of heliostats in the array and/or the wind load statistics at that location.

In addition, the heliostat drive assemblies are configured with reduced parts for simplified assembly and lower cost. Using reduced parts may ultimately reduce backlash by minimizing the impact of manufacturing tolerances on the components.

DETAILED DESCRIPTION OF THE PREFERRED EMBODIMENTS

An improved heliostat assembly 10 is described herein, with reference to FIGS. 1-5. The exemplary heliostat assembly 10 is advantageously configured to provide for a biasing force during energy capture movement even when external loads are applied to the assembly, as described in greater detail herein.

Figure 1:
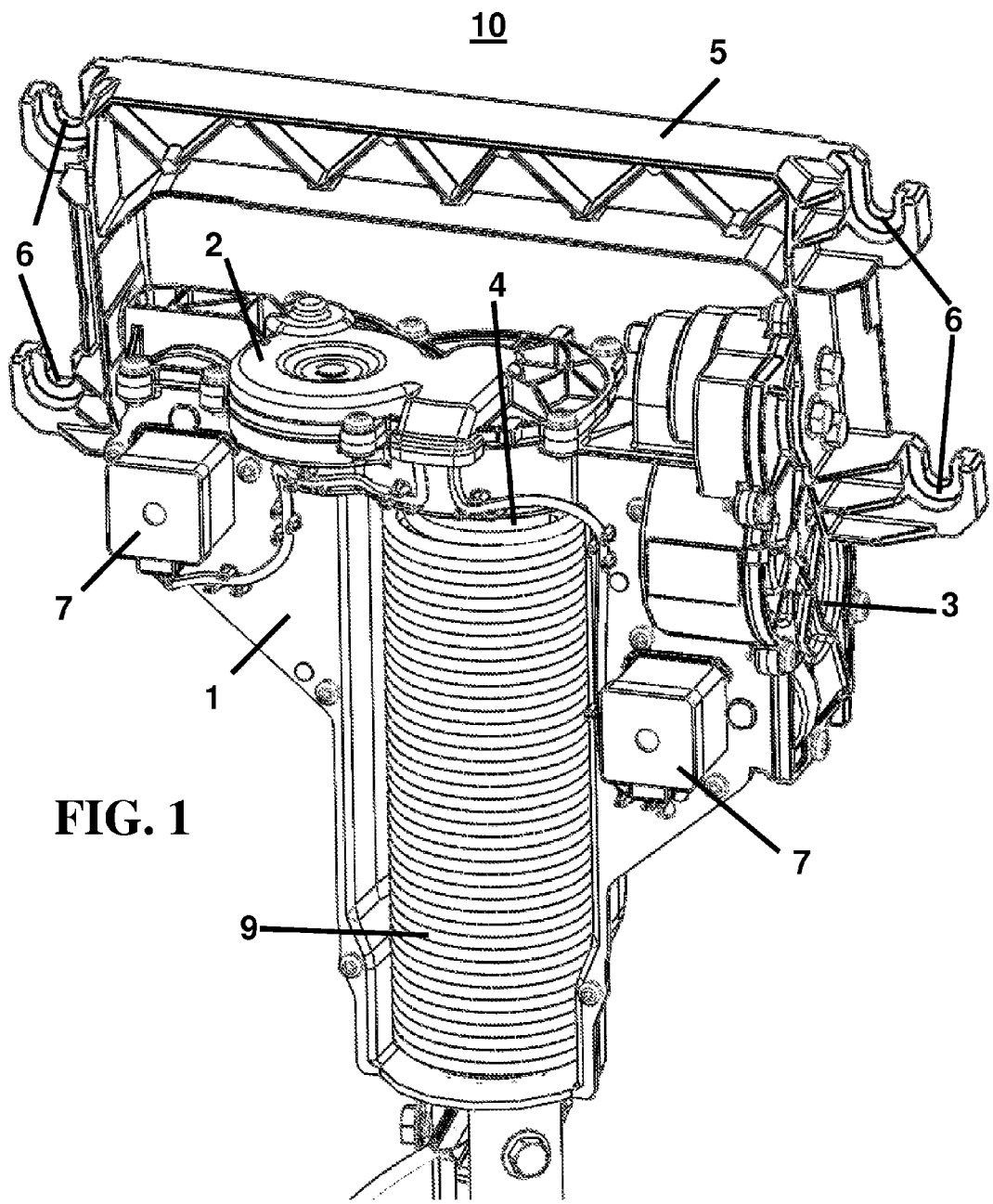
FIG. 1 is a perspective view of an embodiment of a drive assembly for a heliostat, comprising an azimuth gear enclosure having a cover and pivotable about an azimuth axis, and an elevation gear enclosure having a cover and pivotable about an elevation axis.
Figure 2:
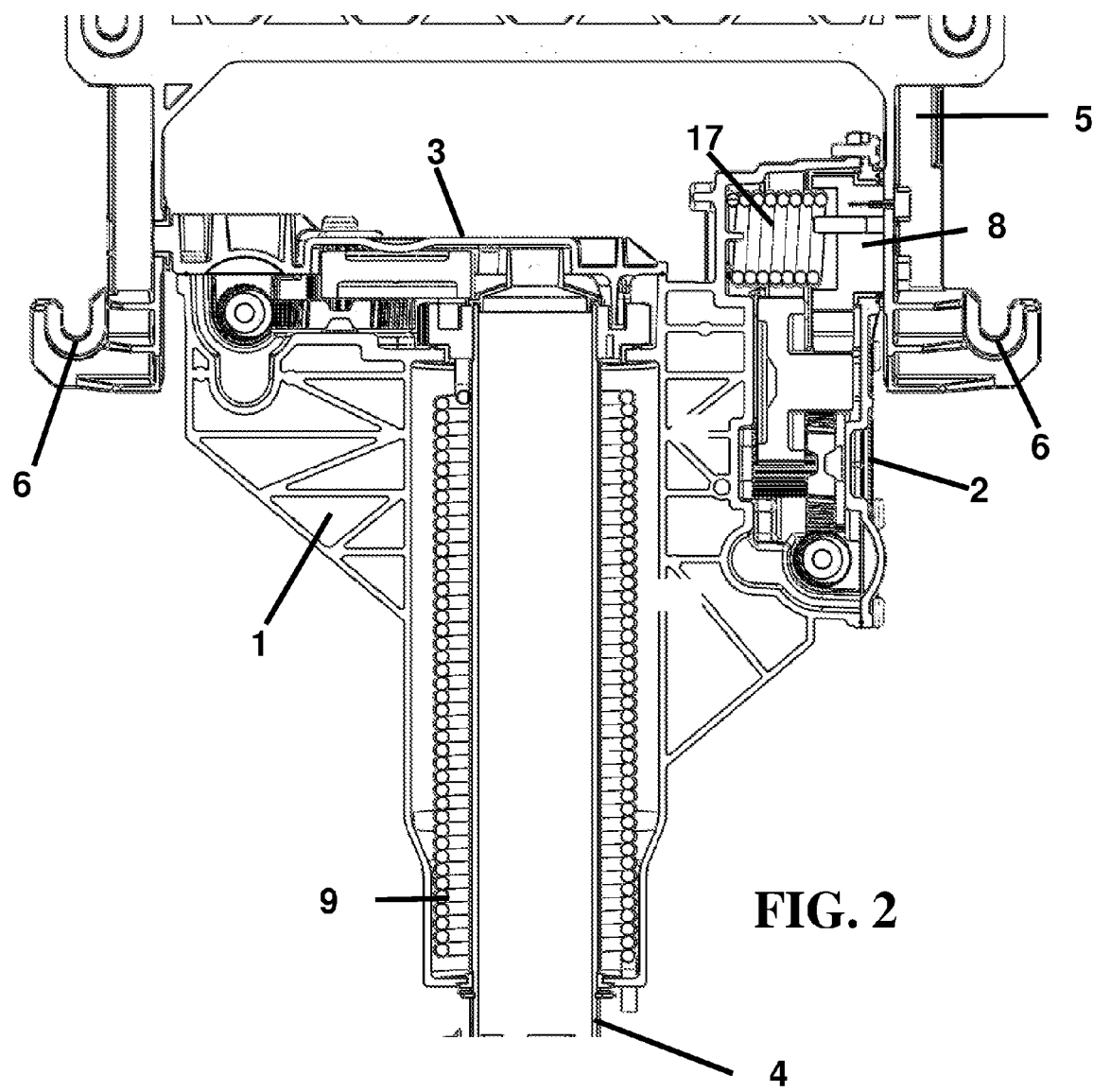
FIG. 2 is a cross-section view of the drive assembly of FIG. 1.

An embodiment of a heliostat drive assembly 10, as illustrated in FIGS. 1 and 2, comprises a chassis 1 and two gear transmissions, wherein each gear transmission may be enclosed in a respective gear enclosure. The chassis may comprise a single element or a plurality of elements bonded together or connected via fasteners. The gear housings may be made integral with the chassis and may comprise, for example, an azimuth gear enclosure 2 and an elevation gear enclosure 3. The azimuth gear enclosure 2 may enclose an azimuth gear transmission for actuating the heliostat drive chassis about an azimuth axis. The azimuth axis may be defined as being orthogonal to the ground and passing through the center of an azimuth drive shaft 4. The elevation gear enclosure 3 may enclose an elevation gear transmission for actuating a reflector channel 5 about an elevation axis. The elevation axis may be defined as orthogonal to the azimuth axis and co-linear with the center of an elevation output gear 8 (see FIG. 2). The elevation and azimuth gear transmissions may be driven by motors 7 that receive power from an internal or external power source. A reflector (not shown) may be mounted to the reflector channel 5 via fastener slots 6. The drive assembly may further comprise an azimuth torsion spring 9 that surrounds the azimuth drive shaft 4. The azimuth torsion spring may be configured to supply a biasing force on the azimuth output gear to prevent backlash in the azimuth gear transmission. The drive assembly may further comprise an elevation torsion spring 17 connected to the elevation output gear 8. The elevation torsion spring may be configured to supply a biasing force on the elevation output gear to prevent backlash in the elevation gear transmission. By providing resistance against backlash in the respective gear trains, the torsion springs allow the design to employ a simplified drive mechanism, resulting in reduced part costs and improved ease of manufacture.

Each of the azimuth enclosure 2 and the elevation enclosure 3 further encloses a gear transmission for driving the azimuth drive shaft 4 and the reflector channel 5 to rotate about their respective axes. The gear transmissions each comprise a series of interlocking spur gears having a defined gear ratio. The azimuth shaft 4 may be mounted to the support post of a heliostat structure in a fixed manner. The gear transmission of the azimuth enclosure actuates the azimuth shaft to rotate the drive 10 about the azimuth axis. Rotating the drive 10 may permit rotation of a reflector (not shown) attached to the reflector channel 5 about the azimuth axis when the azimuth shaft 4 may be mounted vertically. The gear transmission of the elevation enclosure actuates the output elevation gear 8 to rotate the reflector channel 5 about the elevation axis, thereby changing the inclination angle of a reflector (not shown) attached to the channel. Each of the gear transmissions in enclosures 2 and 3 may be independently driven by an associated electrical motor 7. When driven by the associated electrical motor, each of the gear transmissions operates to rotate the azimuth drive shaft 4 or reflector channel 5 via an output spur gear.

Figure 3:
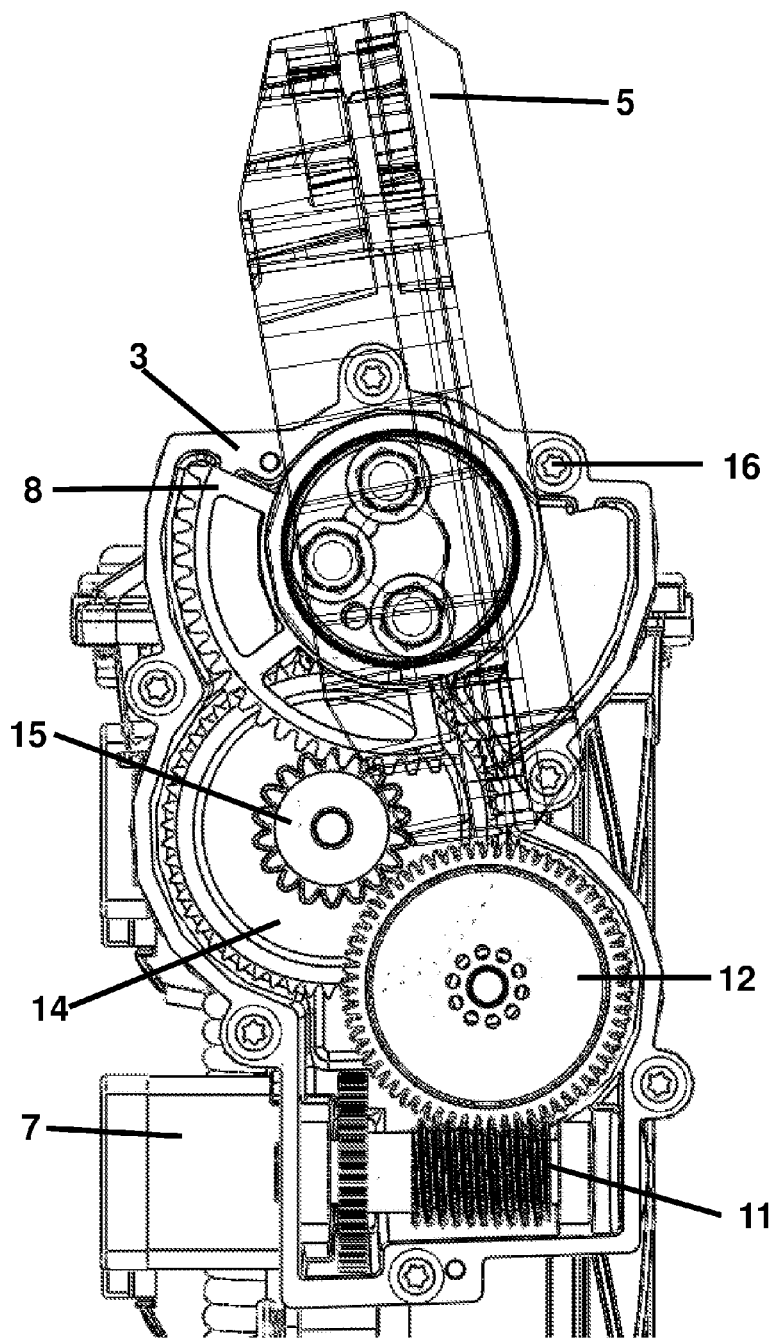
FIG. 3 is a side view of the drive assembly of FIG. 1 showing the inside of the elevation gear enclosure with the cover removed.
Figure 4:
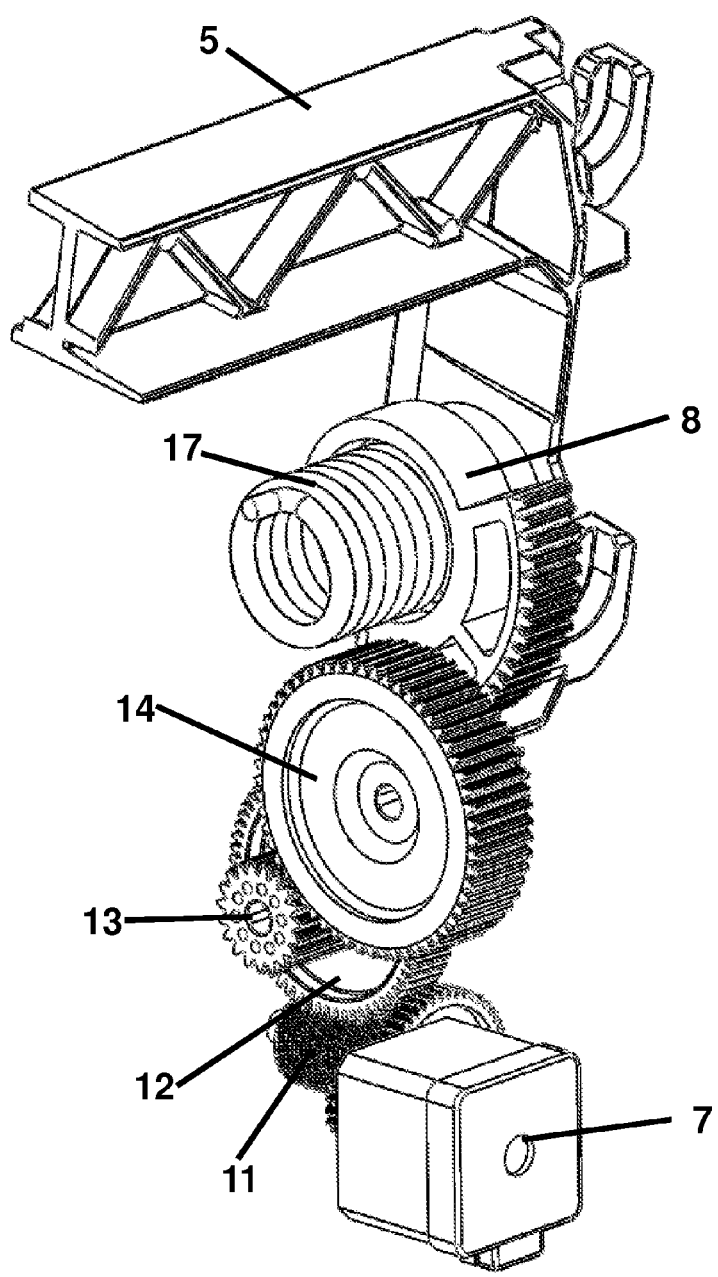
FIG. 4 is a perspective view of the elevation gear transmission removed from the elevation gear enclosure.

The elevation gear transmission, as illustrated in two perspectives in FIG. 3 and FIG. 4, may comprise a worm gear 11 driven by an input motor 7, wherein the worm gear interfaces with a first cluster spur gear. The first cluster spur gear may comprise primary and secondary gears 12 and 13 that are connected to each other or fixedly mounted to the same shaft, wherein the primary gear 12 has a larger diameter than the secondary gear 13, and wherein the primary gear is oriented between the secondary gear and the elevation gear enclosure cover (the cover has been removed in the illustration of FIG. 2). The secondary gear 13 of the first cluster spur gear may interface with a primary gear 14 of a second cluster spur gear, wherein the second cluster spur gear also may comprise primary and secondary gears 14 and 15 that are connected to each other or fixedly mounted to the same shaft, wherein the primary gear has a larger diameter than the secondary gear. The secondary gear 15 of the second cluster spur gear interfaces with the elevation output gear 8, wherein the elevation output gear works to rotate the reflector channel 5 about the elevation axis. The elevation gear transmission may be enclosed within elevation gear enclosure 3 and may be sealed by a enclosure cover which may be fastened to the enclosure via mounting screw holes 16. An elevation torsion spring 17 may be connected to the elevation output gear 8. The torsion spring may induce a biasing force opposite a direction of rotation to reduce backlash in the elevation gear transmission.

Figure 5:
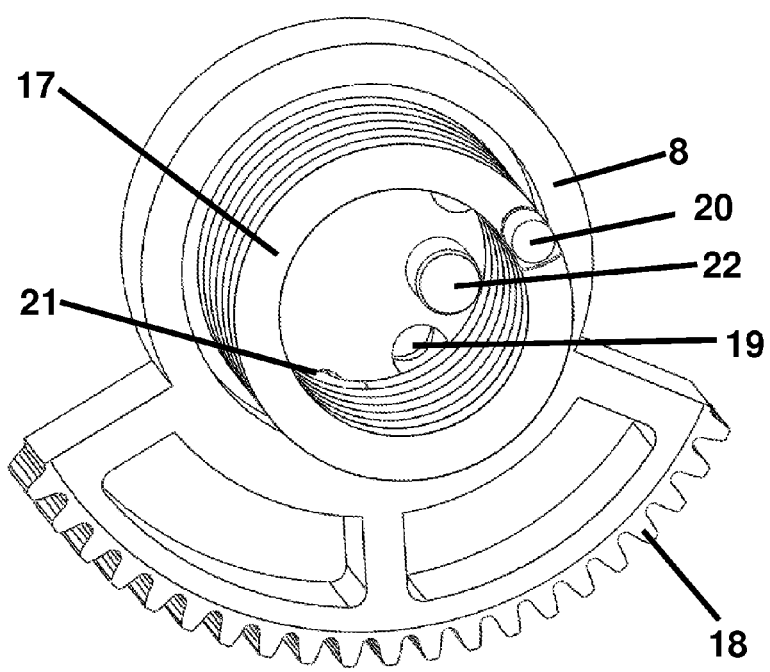
FIG. 5 is a perspective view of an output elevation gear connected to a torsion spring.

The elevation output gear 8, as illustrated in FIG. 5, may comprise an arc segment of gear teeth 18, wherein the arc segment may be between 120 and 150 degrees. The center face of the output gear 8 may be outfitted with a plurality of bolt holes 19, through which fasteners may connect the output gear to the reflector channel 5, and a first spring retaining aperture 21, through which a tip of an elevation torsion spring 17 may be held. The output gear may additionally comprise a protrusion 22 made integral with the output gear or attached thereof, wherein the protrusion is configured to contact the elevation torsion spring during actuation of the output gear 8 through its range of motion. When the elevation torsion spring makes contact with the protrusion, it begins to flex around the protrusion, inducing a biasing force on the output gear, and in so doing on the entire elevation gear transmission.

The enclosures 2 and 3 may be fastened together, such as by using screws or bolts, to the drive chassis 1. The chassis may comprise contoured material that has been shaped to surround the azimuth spring. The formative material of the chassis may comprise metals such as alloys of steel or aluminum. As an additional embodiment, the chassis may be shaped to surround the gear enclosures and motors. The chassis may comprise multiple connected elements bonded together or connected via fasteners or may comprise a single element. The chassis may have a bottom opening through which the azimuth shaft 4 protrudes. In this embodiment, the elevation spring may be set in a recess of the elevation gear enclosure next to the output gear. The inclusion of the elevation spring inside the elevation gear enclosure may have the added benefit of protecting the elevation spring from the environment. By obviating the need for additional components connecting the elevation spring to the output gear inside the elevation gear enclosure, this embodiment also provides for a more compact elevation gear transmission using less parts.

In an exemplary embodiment, additional benefits are derived from the placement of the worm gear in the gear transmission. Rotation of the worm gear by the motor may drive the first stage gear for rotation (and hence the reflector channel or the azimuth shaft) in the desired direction. Conversely, the worm gear resists rotation of the first stage gear by external loading, such as from wind loads on the reflector. Thus, the worm gears functions as a brake while still permitting drivability. Another advantage of the present arrangement is that positioning the worm gears at the output of the motors 7 permits a much smaller diameter worm to be used than if the worm gear was positioned immediately upstream of the output gears. A smaller diameter worm gear may be used because having a worm gear directly actuate the reflector channel 5 or azimuth shaft 9 would require a larger and stiffer gear element. This allows for a worm gear to be supplied using less and cheaper material, resulting in a significantly lower cost.

As previously described, a biasing force about the elevation axis may be supplied by a torsion spring 17 attached to an elevation output gear 8, wherein the elevation output gear may be configured to rotate the reflector channel 5 to which a reflector may be mounted. This torsion spring 17 exerts a force onto the pivot point of the reflector channel in a controlled manner so as to reduce backlash in the gear transmission. In addition to the force supplied by the torsion spring, the biasing force further comprises the force of gravity resulting from the weight of the reflector module mounted to the reflector channel. The heliostat must be able to rotate about the elevation axis with a predetermined range of motion, and so the torsion spring may be sized to accommodate the entire operable range.

To supply the biasing force about the azimuth axis, a torsion spring 9 may be mounted to the output azimuth shaft 4, which may be made integral with the output of the of the azimuth enclosure. As above, the torsion spring 9 exerts a force onto the output pivot point in a controlled manner. The heliostat must be able to rotate about the azimuth axis over a range of motion of at least 350 degrees. Because the heliostat must actuate about the azimuth axis over a greater range of motion than about the elevation axis, and because the expected loads on the heliostat in the azimuth direction are higher than those in the elevation direction, the azimuth torsion spring must be substantially different from the elevation torsion spring. In this particular embodiment the torsion spring used to counteract backlash about the azimuth axis is larger and may have a greater stiffness than the torsion spring required for the elevation axis.

In an additional embodiment of the present invention, the biasing force about the elevation axis may be supplied by a leaf spring. The leaf spring may be actuated in a single direction and sized towards the range of motion of the heliostat about the elevation axis. Additional exemplary embodiments may include an extension or compression spring to provide the bias load in place of the leaf or torsion spring. Similar to the biasing approaches described previously, the spring force may be chosen to ensure proper tooth engagement of the gears under the majority of operating conditions, thereby advantageously reducing backlash and ensuring the gears are fully intermeshed to improve tracking efficiency. One should note, any of the gears in the gear transmissions may be spring biased in a like manner, either alone or in combination.

In an additional embodiment, biasing of the gear trains about the azimuth or elevation axes may be applied by adjusting the center of mass of the structure to supply a gravity bias force. A gravity bias force about the azimuth or elevation axes may also be applied using spring loaded gears, counterweights, or some combination thereof.

Multiple heliostat assemblies 10 or 10 with attached reflectors may be provided in an array. Dependent upon a variety of factors, such as geographic location of the plant and the location in the array, each heliostat assembly may have a particular energy capture envelope. The energy capture envelope may be defined as the range of motion (the boundary to a two-dimensional region in the heliostat's configuration space) necessary for the heliostat to reflect all (or a substantial amount of) incident sunlight to the central tower in a concentrated solar power plant. Each heliostat, according to its position relative to a receiver, may be associated with a specific energy capture envelope. Energy capture envelopes for all heliostats may be aggregated, such that there may be a universal energy capture envelope for an array of heliostats for a given plant. As long as each of the heliostats meets this universal energy capture envelope, any one heliostat will have a full range of motion necessary to reflect all incident sunlight to the central tower.

The sources of the biasing forces, and the magnitude of the forces, may be adjusted such that there always exists a biasing force through the energy capture envelope. For example, if there is a predicted maximum external force (such as due to wind) of 6 Nm, then an 8 Nm biasing force will suffice to ensure that there is always a biasing force. Conversely, if there is a predicted maximum external force of 10 Nm, then the 8 Nm biasing force will be insufficient and may be increased to a suitable amount about 10 Nm. In this manner, the heliostat assemblies 10 may be designed to ensure that there is always a biasing force, thereby advantageously reducing backlash, ensuring the gears are intermeshed in a given direction and improving tracking efficiency. Further, the heliostats may be configured to take advantage of a wind load, such as if the wind load is predicted to predominantly be on one side of the reflector, or a substantial portion thereof.

Various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

I claim:

1. A heliostat drive assembly for dynamically adjusting the position of a reflector, the drive assembly comprising:
   a drive chassis;
   at least one drive shaft;
   a reflector channel;
   an azimuth gear transmission comprising a series of interlocking spur gears, wherein the azimuth gear transmission is configured to rotate the drive shaft about an azimuth direction via an azimuth output gear;
   an elevation gear transmission comprising a series of interlocking cluster spur gears and at least one worm gear, wherein the elevation gear transmission is configured to rotate the reflector channel about an elevation direction via an elevation output gear;
   an azimuth torsion spring that surrounds said drive shaft, wherein said azimuth torsion spring is configured to supply a biasing force on said azimuth output gear; and
   an elevation torsion spring connected to said elevation output gear, wherein said elevation torsion spring is configured to supply a biasing force on said elevation output gear.

2. The heliostat drive assembly of claim 1, wherein the heliostat drive assembly further comprises a reflector mounted to said reflector channel.

3. The heliostat drive assembly of claim 1, wherein the azimuth and elevation torsion springs are configured such that they each supply a biasing force based on predicted or actual wind loads.

4. The heliostat drive assembly of claim 1, wherein the azimuth and elevation gear transmissions are housed in gear enclosures.

5. The heliostat drive assembly of claim 4, wherein said gear enclosures are made integral with the drive chassis.

6. The heliostat drive assembly of claim 1, wherein the azimuth and elevation gear transmissions each comprise a gear biased into engagement with at least one other gear using said azimuth or elevation torsion springs.

7. The heliostat drive assembly of claim 2, wherein the center of gravity of the reflector biases the at least one drive shaft.

8. The heliostat drive assembly of claim 1, wherein the magnitude of the biasing forces supplied by the azimuth or elevation torsion springs may be adjusted such that there always exists a biasing force through the heliostat range of motion necessary for the heliostat to reflect incident sunlight to the central tower in a concentrated solar power plant.

9. The heliostat drive assembly of claim 1, wherein the elevation output gear comprises an arc segment of gear teeth, wherein the arc segment may be between 120 and 150 degrees.

10. The heliostat drive assembly of claim 9, wherein the elevation output gear comprises:
    a center face outfitted with a plurality of bolt holes through which fasteners connect said elevation output gear to said reflector channel;
    a spring retaining aperture through which a tip of said elevation torsion spring is held; and
    a protrusion configured to contact the elevation torsion spring during actuation of said elevation output gear through its range of motion, wherein said torsion spring induces a biasing force on said elevation output gear when said torsion spring makes contact with said protrusion.

11. The heliostat drive assembly of claim 1, wherein the azimuth torsion spring is larger than the elevation torsion spring.

12. The heliostat drive assembly of claim 11, wherein the azimuth torsion spring has a greater stiffness than the elevation torsion spring.

* * * * *